Feb. 25, 1958 J. F. BOINEY 2,824,849
DICYANDIAMIDE PHENOLALDEHYDE RESIN VARNISH
AND PROCESS OF PREPARATION
Filed April 26, 1956
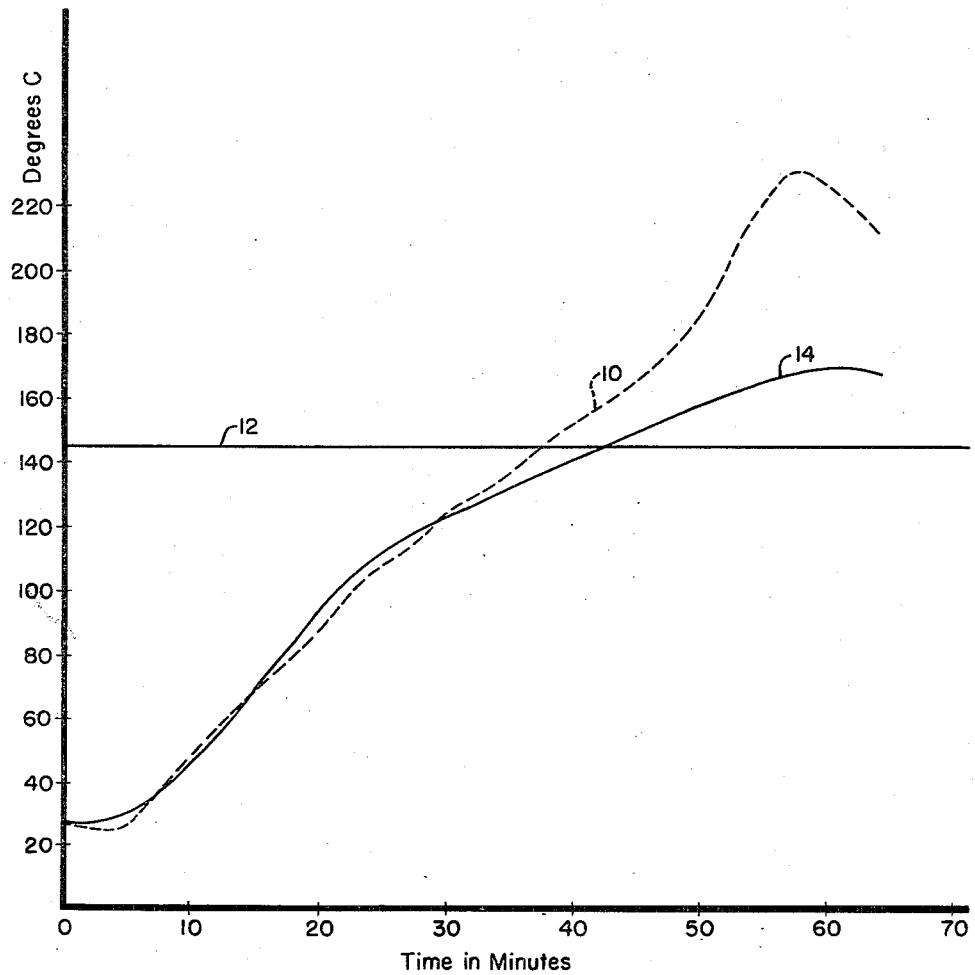
WITNESSES:
INVENTOR
Joesph F. Boiney
BY
ATTORNEY United States Patent Office 2,824,849
Patented Feb. 25, 1958

2,824,849

DICYANDIAMIDE PHENOLALDEHYDE RESIN VARNISH AND PROCESS OF PREPARATION

Joseph F. Boiney, Hampton, S. C., assignor to Westinghouse Electric Corporation, East Pittsburgh, Pa., a corporation of Pennsylvania Application April 26, 1956, Serial No. 580,862

4 Claims. (Cl. 260—33.4)

This invention relates to the preparation of novel resinous varnish compositions to be employed in preparing relatively thick fire-resistant thermoset laminates therefrom, and the products so produced.

It has been desirable to have available, particularly in the electrical industry, resinous laminates that are highly fire-resistant while possessing good electrical resistance properties, both dry and when subjected to humidification, as well as having high strength and other physical properties. Resinous laminates of this type in the forms of plates, tubes, channels, angles and other forms are particularly desirable for use in switchgear, switchboards, tap changers and similar electrical apparatus that may be subjected to electrical arcs due to opening of electrical contacts.

Highly fire-resistant laminates with excellent mechanical and electrical properties have been prepared by employing the phenol-dicyandiamide-formaldehyde resin varnish composition disclosed in the application of David E. Baldwin et al., Serial Number 443,720, filed July 15, 1954, now Patent No. 2,801,672, and assigned to the same assignee as the present invention. However, a strong exothermic reaction takes place during the molding of laminates comprising a phenol-dicyandiamide-formaldehyde resin and sheet fibrous material. This exothermic reaction becomes progressively more difficult to control as the thickness of the laminate increases. No great difficulty is incurred during the molding of laminates up to ½ inch in thickness because the heat evolved is dissipated to the platen plates rapidly enough so that the laminate does not char, crack or decompose.

In the manufacture of laminates of a thickness of greater than ½ inch, it is difficult to control the rate of output of heat resulting from the exothermic reaction and as a result the laminate has large burned areas near the center, rendering the laminate useless. Such thick laminates have also exploded in the press, causing pieces of the laminate to fly in all directions.

It is desirable in many applications to employ laminated members having a thickness of from ½ inch to 2 inches or more in thickness. In addition to the excellent fire-resistant properties possessed by phenol-dicyandiamide-formaldehyde laminates, properly molded laminates possess outstanding mechanical and electrical properties and may be employed for many applications where fire resistance is not particularly important.

The object of the invention is to provide for producing thermosettable resinous reaction products by reacting phenol, dicyandiamide and formaldehyde to provide A-stage resin of such nature that it possesses low exothermic reaction when applied to fibrous sheet material and cured under heat and pressure.

A further object of the invention is to provide relatively thick thermoset laminates comprising a fibrous sheet material and a thermoset reaction product of phenol, dicyandiamide and formaldehyde, which thick laminates have a high fire resistance, good electrical insulating properties and high physical strength.

Other objects of the invention will, in part, be obvious and will, in part, appear hereinafter.

For a better understanding of the nature and objects of the invention, reference should be had to the following detailed description and drawing in which the single figure is a graph plotting time against temperature for a molding cycle.

I have found a novel process for preparing phenol-dicyandiamide-formaldehyde resins so that the exothermic reaction that takes place during molding of the resinous laminates will be reduced considerably and will result in the ability to manufacture laminates of greater thickness than heretofore possible. This is attained by mixing and reacting the various resin components together in a certain specified order and under certain particular conditions.

The resin varnish of this invention is derived by reacting phenol, dicyandiamide and formaldehyde in the proportions of 1 mole of the phenol, from 0.8 mole to 2 moles of dicyandiamide and from 0.5 to 0.9 mole of aqueous formaldehyde per mole of the combined phenol and dicyandiamide. Water is present, being usually furnished as part of the aqueous formaldehyde solution (37% to 40%), and amounting to at least 10% of the weight of the reactants, and ordinarily will not exceed the weight of the reactants. The mixture is reacted in the presence of an alkylolamine catalyst for at least ½ hour, and preferably by refluxing for from 1 to 2 hours, and is then vacuum dehydrated under a vacuum of at least 25 inches of mercury while heat is applied during the evacuation until substantially all the water is removed. The vacuum dehydration is carried out at a temperature of about 80° C. to 105° C. until a sample of the resin cooled to room temperature, 25° C., is brittle. A string of such properly reacted resin at room temperature breaks when bent slightly. When this condition is reached there is added to the dehydrated reaction product a volatile solvent and a sufficient amount of hexamethylenetetramine compound to bring the ratio of the total amount of formaldehyde to the combined phenol and dicyandiamide to a value of from 0.95 to 1.5. This mixture is then refluxed for at least ½ hour and preferably from 1½ hours to 2 hours. After this refluxing period the resin varnish is permitted to cool to room temperature.

The varnish may include a small proportion of the order of 2% to 10% by weight of finely divided solids such as silica, aluminum oxide, antimony oxide, and the like refractory solids, to impart better flame resistance.

The resulting impregnating varnish is applied to fibrous sheet materials and particularly cellulosic fibrous materials, such as kraft paper, alpha paper and cotton cloth. Laminates having exceptional flame resistant properties and high strengths may be obtained when the varnish is applied to cellulosic materials. However, other fibrous materials may be used, such as glass cloth, glass mat, asbestos cloth, nylon cloth and other synthetic resinous fabrics or mixture of two or more fibrous materials, such for example as a cloth woven from the mixture of nylon and cotton.

The fibrous sheet material is dipped in the varnish one or more times until it has picked up resin solids in an amount of from 0.7 to 2 times the weight of the dry fibrous material and the varnish impregnated fibrous material is passed through an oven or other dryer after each dip to remove the volatile solvent. During drying, it is desirable to heat the fibrous material treated with the varnish composition at a temperature of from 110° C. to 150° C. for a brief period in order to remove the solvent therefrom promptly and to advance the cure of the resin well in to the "B" stage. The heat treatment of the applied phenol-dicyandiamide-formaldehyde resin at this stage is conducted so that the resulting treated fabric has a "greenness" of from 0.5% to 10%. The greenness is determined by placing a small piece of the resin treated sheet material in a hot press at a temperature of 175° C. and a pressure of 1000 pounds per square inch for 5 minutes, and then measuring the amount of resin that is forced out of the sample, that is, the resin that extends beyond the fibrous sheet material proper, and determining the proportion of this exuded resin to all of the resin in the sample. A greenness of 10% is relatively high and is desirable for the making of certain products, such as tubes which require a considerable flow of resin between laminations in order that the laminations bond adequately. A greenness of about 0.5% on the other hand is relatively low but is particularly essential for the purpose of making thick flat laminates, of ½ inch thickness and greater.

The sheet fibrous material, with the applied "B" stage phenol-dicyandiamide-formaldehyde resinous reaction product thereon, may be molded into laminates, tubes and other members by superimposing a plurality of layers of the treated sheet material and compressing them at pressures of from 150 to 5000 pounds per square inch at temperatures of from 135° C. to 165° C. It will be appreciated that the fibrous sheet material may be chopped or macerated, or otherwise treated, and members molded from such comminuted fibrous material. Of course, the highest strength products are secured with laminates made from superimposed layers of the impregnated fibrous sheet material.

The following example is illustrative of the preparation of a phenol-dicyandiamide-formaldehyde resin varnish by a method as set forth in the Baldwin application previously referred to.

*Example I*

Into a steam heated reaction kettle there were introduced the following:

| | Parts by weight |
|---|---|
| Phenol | 560 |
| Dicyandiamide | 500 |
| Formaldehyde (37%) | 1160 |
| Ammonia (28%) | 22½ |

The ammonia and the formaldehyde were admixed before being introduced into the kettle with the remainder of the ingredients, the mixture having a pH of approximately 8.5. The mixture was slowly heated, and at 80° C. an exothermic reaction took place that carried the temperature to approximately 95° C. Additional heat was then supplied in order to cause the reaction mixture to reflux. The mixture was refluxed for 90 minutes and then dehydrated under a vacuum of 27 inches of mercury, and the temperature gradually increased to approximately 75° C. during dehydration. Substantially all the water had been removed. The resulting reaction product was then dissolved in a solvent mixture comprising 610 parts by weight of 95% ethanol and 290 parts by weight of water. The resulting varnish had a viscosity of approximately 250 centipoises and between 52% and 55% by weight of recoverable resin solids. The set time of the varnish was approximately 16 minutes at 153° C.

The following example is illustrative of the phenol-dicyandiamide-formaldehyde resin varnish prepared in accordance with this invention.

*Example II*

Into a steam heated reaction vessel there were introduced the following:

| | Parts by weight |
|---|---|
| Phenol | 120 |
| Dicyandiamide | 105 |
| Formaldehyde (37%) | 150 |
| Triethanolamine | 4.8 |

The mixture was heated slowly, and at 80° C. an exothermic reaction took place that carried the temperature to approximately 95° C. Additional heat was then supplied in order to cause the mixture to reflux. The mixture was refluxed for 2 hours and then dehydrated under a vacuum of 27 inches of mercury, and the temperature gradually increased to approximately 85° C. during dehydration. Substantially all the water was removed. Vacuum dehydration was carried out until the resin was brittle when cooled to room temperature. To the reaction product there were added the following:

| | Parts by weight |
|---|---|
| Ethanol (95%) | 126 |
| Water | 63 |
| Hexamethylenetetramine | 30 |

This mixture was then heated slowly to reflux and refluxed for two hours. At the end of the reflux period the mixture was permitted to cool to room temperature. The resulting varnish had a viscosity of approximately 150 centipoises and between 52% and 55% by weight of recoverable resin solids. The set time of the varnish was approximately 17 minutes at 153° C. The specific gravity of the varnish was between 1.100 and 1.115.

*Example III*

The varnish of Example I was employed to impregnate sheets of 12" by 12" by 10 mil thick alpha paper, the impregnated paper containing 53% of its weight of the resin solids at a greenness of 0.5%. Laminates were prepared from the impregnated paper by superimposing a sufficient number of laminations to produce consolidated members of ¾" in thickness. The superimposed layers were consolidated at 1200 pounds per square inch with the temperature of the press platens being at 145° C. Thermocouples were embedded in the laminates and the temperature rise noted at various time intervals. A maximum temperature rise to 230° C. was noted or 85° C. above the temperature of the press platens. Referring to the single figure of the drawing, the temperature rise of the laminate is denoted by the curve 10. It will be noted that the temperature rise is accelerated at a high rate after it reaches the temperature of the platen as indicated by the line 12, thus indicating the large exotherm of this resin.

*Example IV*

The varnish of Example II was employed to impregnate sheets of 12" by 12" by 10 mil thick alpha paper, the impregnated paper containing 53% of its weight of the resin solids of a greenness of 0.5%. Three-quarter inch laminates were made and tested by the same procedure employed in Example III, the temperature of the press platens being at 143° C. A maximum temperature rise to 170° C. was noted or only 27° above the platen temperature. The temperature rise is indicated by the curve 14 in the single figure of the drawing. It will be noted further that the curve 14 shows a slow gradual rise after the platen temperature is reached as compared to the sudden sharp rise of curve 10.

It will be understood that the resinous compositions of this invention may be prepared by substituting cresol for a part or all of the phenol. Furthermore, other mono, di and tri alkylolamine catalysts having alkylol groups having not over 4 carbons may be employed in carrying out the reaction. Examples of suitable alkylolamine catalysts are monoethanolamine, diethanolamine and triisopropanolamine. Mixtures of two or more alkylolamines may be employed. The catalyst may be employed in an amount of from 0.1% up to 5% based on the weight of the phenol. Ammonia can be substituted for a part of the alkylolamine catalyst ordinarily not exceeding 50% by weight of the catalyst.

In preparing the varnish impregnating composition of this invention, I have secured particularly good results by using as a volatile solvent a mixture of ethanol and water

I claim as my invention:

1. In the process of producing a dicyandiamidephenol-aldehyde resin varnish, the steps comprising refluxing one mole of a phenol, from 0.8 mole to 2.0 moles of dicyandiamide and from 0.5 to 0.9 mole of aqueous formaldehyde for each mole of the combined phenol and dicyandiamide for a period of time of from ½ hour to 2 hours in the presence of from 0.1% to 5.0%, based on the weight of the phenol, of an alkylolamine catalyst having not over 4 carbon atoms in the alkylol radicals, evacuating the refluxed reaction product to a vacuum of at least 25 inches of mercury while applying heat during the evacuation to a point where a sample of resin is brittle at room temperature, thereafter adding to the refluxed reaction product a volatile solvent selected from at least one of the groups consisting of one to three carbon atom monohydric aliphatic alcohols with not over 50° by weight of water, a sufficient amount of hexamethylenetetramine to bring the ratio of the total amount of formaldehyde to the combined phenol and dicyandiamide to a value of from 0.95 to 1.5, refluxing for a period of time of from ½ hour to 2 hours, and thereafter cooling the varnish to room temperature.

2. The process of claim 1 in which the alkylolamine catalyst is triethanolamine.

3. The process of claim 1 in which ammonia is substituted for a portion of the alkylolamine.

4. A composition of matter comprising a dicyandiamide-phenol-aldehyde resin varnish derived by refluxing one mole of a phenol, from 0.8 mole to 2.0 moles of dicyandiamide and from 0.5 to 0.9 mole of aqueous formaldehyde for each mole of the combined phenol and dicyandiamide for a period of time of from ½ hour to 2 hours in the presence of from 0.1% to 5.0% based on the weight of the phenol, of an alkylolamine catalyst having not over 4 carbon atoms in the alkylol radicals, evacuating the refluxed reaction product to a vacuum of at least 25 inches of mercury while applying heat during the evacuation to a point where a sample of resin is brittle at room temperature, thereafter adding to the refluxed reaction product a volatile solvent selected from at least one of the groups consisting of one to three carbon atom monohydric aliphatic alcohols with not over 50% by weight of water, a sufficient amount of hexamethylenetetramine to bring the ratio of the total amount of formaldehyde to the combined phenol and dicyandiamide to a value of from 0.95 to 1.5, refluxing for a period of time of from ½ hour to 2 hours, and thereafter permitting the varnish to cool to room temperature, the varnish comprising from 20% to 60% resin solids.

References Cited in the file of this patent
UNITED STATES PATENTS

| | | |
|---|---|---|
| 1,938,917 | Loetscher | Dec. 12, 1933 |
| 2,314,701 | Harvey | Mar. 23, 1943 |
| 2,315,400 | D'Alelio | Mar. 30, 1943 |
| 2,606,885 | Schmutzler | Aug. 12, 1952 |
| 2,660,215 | Arone | Nov. 24, 1953 |